United States Patent [19]
Wagner et al.

[11] Patent Number: 5,761,292
[45] Date of Patent: Jun. 2, 1998

[54] SIMULTANEOUS TRANSFER OF CONTROL INFORMATION WITH VOICE AND DATA OVER A PUBLIC SWITCHED TELEPHONE NETWORK LINE

[75] Inventors: Larry Wagner, Oakland, Calif.; Ralph S. Smith, Forest Grove; Daniel R. Cox, Eugene, both of Oreg.

[73] Assignee: Intel Corporation, Santa Clara, Calif.

[21] Appl. No.: 912,947

[22] Filed: Aug. 14, 1997

Related U.S. Application Data

[63] Continuation of Ser. No. 687,773, Jul. 26, 1996, abandoned, which is a continuation of Ser. No. 597,352, Feb. 6, 1996, abandoned, which is a continuation of Ser. No. 254, Jan. 4, 1993, abandoned.

[51] Int. Cl.$^6$ ................................................ H04M 11/06
[52] U.S. Cl. .................... 379/229; 379/93.09; 379/93.26; 370/468; 370/522
[58] Field of Search ........................... 379/229, 93.01, 379/93.09, 93.14, 93.26; 348/14, 15, 16; 370/522, 264, 265, 281, 437, 468

[56] References Cited

U.S. PATENT DOCUMENTS

| | | | |
|---|---|---|---|
| 2,974,281 | 11/1961 | Feldman | 370/111 |
| 4,425,661 | 1/1984 | Moses et al. | 375/1 |
| 4,435,804 | 3/1984 | Tan | 370/69.1 |
| 4,442,540 | 4/1984 | Allen | 370/69.1 |
| 4,476,559 | 10/1984 | Brolin et al. | 370/110.1 |
| 4,715,059 | 12/1987 | Cooper-Hart et al. | 348/18 |
| 4,757,495 | 7/1988 | Decker et al. | 370/69.1 |
| 4,932,047 | 6/1990 | Emmons et al. | 348/18 |

FOREIGN PATENT DOCUMENTS

| | | |
|---|---|---|
| 0084125 | 12/1982 | European Pat. Off. . |
| 2187611 | 9/1987 | European Pat. Off. . |
| 0 501 485 A2 | 2/1992 | European Pat. Off. . |
| 63-304759 | 12/1988 | Japan . |
| 1-11460 | 1/1989 | Japan . |
| 1-202064 | 8/1989 | Japan . |
| 2-198264 | 8/1990 | Japan . |
| 3-292047 | 12/1991 | Japan . |
| 2268665 | 6/1993 | United Kingdom . |

OTHER PUBLICATIONS

Technische Rundschau, vol. 84, No. 4, 24 Jan. 1992, Bern Ch pp. 36–38, XP247737 Braun "Auf der Schiene: zum Computer Integrated Railroading".
Mitel Corporation Data Sheet for "Data Over Voice Modem Chip", Part #MT8840, issue 3, Dec. 1987.
Schwartz, Jeffrey, "User Deploys Data–Voice System", article appearing in *Communication Week*, Sep. 28, 1992.
Stockford, Paul, "VoiceView offers Voice and Data Over a Single Analog Line", article appearing in *Voice Processing Magazine*, Jul. 1992.

*Primary Examiner*—Ahmad F. Matar
*Attorney, Agent, or Firm*—Blakely, Sokoloff, Taylor & Zafman

[57] ABSTRACT

A transceiver providing simultaneous transfer of control information with voice and data over a public switched telephone network line is disclosed. In a typical system application, the transceiver is coupled to a public switched telephone network (PSTN) via a single telephone line. The transceiver includes logic for generating control information and for combining the control information with voice signals or data signals for transmission and reception through the PSTN using a single telephone line. The present invention provides a PSTN channel having two component subchannels, a main channel and a side channel. The main channel is provided for the transfer of voice signals and data signals at the same time the side channel is transferring control information and/or additional data signals. The control information transferred on the side channel is used primarily for selecting the transfer of either voice signals or data signals on the main channel. By providing a separate and independent side channel for controlling the main channel, the present invention eliminates the inherent delays caused in the prior art design by switching between a voice transfer mode and a data transfer mode using a single channel. The present invention also allows the transfer of data signals on the side channel simultaneously with the transfer of voice signals on the main channel. These advantages are provided by the present invention without redefining the bandwidth of the standard PSTN channel.

15 Claims, 3 Drawing Sheets

SIMULTANEOUS TRANSFER OF CONTROL INFORMATION WITH VOICE AND DATA OVER A PUBLIC SWITCHED TELEPHONE NETWORK LINE

This is a continuation of application Ser. No. 08/687,773, filed Jul. 26, 1996, now abandoned, which is a continuation of application Ser. No. 08/597,352, filed Feb. 6, 1996, now abandoned, which is a continuation of application Ser. No. 08/000,254, filed Jan. 4, 1993, now abandoned.

BACKGROUND OF THE INVENTION

1. Field of the Invention

The present invention relates to the field of information transfer across public switched telephone systems. Specifically, the present invention pertains to the transmission of binary information or facsimile data with voice signals on a public switched telephone network.

2. Related Art

Several prior art designs provide various levels of voice and data transmission capabilities. In one implementation, a system provides two separate communication links: one link for data and the other link for voice signals. In a typical implementation of this type, two telephone lines are used to handle a data conference. One telephone line is used for transmission of data. The other telephone line is used for the transmission of voice. This implementation, however, consumes at least two telephone lines for each such data conference. In a multipoint conference configuration, two separate telephone bridges would be required to handle such a data conference.

In another implementation of systems combining voice and data information, a communications medium separate from the telephone network is provided. This separate communications medium can be implemented as a separate and independent twisted pair high speed data communications medium. Because these independent transmission media can be optimized for the transmission of voice and data, satisfactory data and voice information rates can be achieved. These systems, however, require that costly installation of the independent communications medium be undertaken. In many cases, the high cost of such an installation is not justified by the need for a combined voice and data system. In other cases, the installation of such a communications medium may not even be possible.

Still other prior art systems can transmit voice signals and data on a single telephone line; however, the transmission of data and voice does not occur simultaneously with control information. In various forms, these systems provide a means to select between a voice transmission mode or a data transmission mode. Each of these modes of transmission are mutually exclusive of the other mode. Thus, a single telephone line may be used to transfer voice information during a first time frame and binary computer data during a second time frame. In many of these systems, a significant time delay is required to change from one mode to the other; because no independent control method is provided. Although these systems carry the benefit of using only a single line of a public switched telephone network, several inefficiencies result from the need to switch between a voice mode or a data mode without independent control. Because in some cases switching between modes is a slow operation, loss of voice or data signals may occur. At the very least, the speed of information transfer across the public switched telephone line is significantly reduced. In other cases, the lack of an independent control mechanism for switching between a voice transfer and a data transfer mode causes the need for a significant level of operator interaction with the system. Increased levels of operator interaction again decrease the speed of information transfer.

Thus, a better means for transferring voice information and data across a single public switched telephone network line is needed.

SUMMARY OF THE INVENTION

The present invention is a transceiver providing simultaneous transfer of control information with voice and data over a public switched telephone network line. In a typical system application, the transceiver is coupled to a public switched telephone network (PSTN) via a single telephone line. The transceiver includes a Voice In interface, a Voice Out interface, a Data In interface, and a Data Out interface. The transceiver includes logic for generating control information and for combining the control information with voice signals or data signals for transmission through the PSTN using a single telephone line. Similarly, this control logic includes logic for receiving the control information as combined with voice and data signals via a single telephone line. The control logic further includes logic for isolating the voice signals received via the telephone line and routing the voice signals through the Voice Out interface. The control logic includes logic for isolating data signals received on the telephone line and for transferring the data signals to a host computer through the Data Out interface. In this manner, the present invention provides a means for transmitting and receiving control information with voice information and computer data via a single standard telephone line.

The present invention modifies the prior art PSTN channel to create a new PSTN channel having two component subchannels, a main channel and a side channel. By dividing the PSTN channel into a main channel and a side channel, the present invention gains the advantage of providing the main channel for the transfer of voice signals and data signals at the same time the side channel is transferring control information and/or additional data signals. The control information transferred on the side channel is used primarily for selecting the transfer of either voice signals or data signals on the main channel. By providing a separate and independent side channel for controlling the main channel, the present invention gains the advantage over the prior art of eliminating the inherent delays caused in the prior art design by switching between a voice transfer mode and a data transfer mode using a single channel. The present invention also provides the advantage of allowing the transfer of data signals on the side channel simultaneously with the transfer of voice signals on the main channel. In this manner, the transfer of voice signals does not completely suppress the simultaneous transfer of computer information. These advantages are provided by the present invention without redefining the bandwidth of the standard PSTN channel.

It is therefore an object of the present invention to provide a system for the simultaneous transfer of control information with voice and data across a single public switched telephone network line. It is a further object of the present invention to provide a system wherein two transmission channels are provided on a single public switched telephone line. It is a further object of the present invention to provide a system wherein control information is transmitted simultaneously on the same public switched telephone network line with voice signals and data signals. It is a further object of the present invention to provide a system for automatically switching between a voice transfer mode and a data transfer mode using independent control information transmitted with the voice signals or data signals.

These and other objects of the present invention will become apparent as presented and described in the following detailed description of the preferred embodiment.

DETAILED DESCRIPTION OF THE PREFERRED EMBODIMENT

The present invention is a transceiver providing simultaneous transfer of control information with voice and data over a public switched telephone network line. In the following description, numerous specific details are set forth in order to provide a thorough understanding of the present invention. However, it will be apparent to one of ordinary skill in the art that these specific details need not be used to practice the present invention. In other circumstances, well known structures, circuits, and interfaces have not been shown in detail in order not to unnecessarily obscure the present invention.

Figure 1:
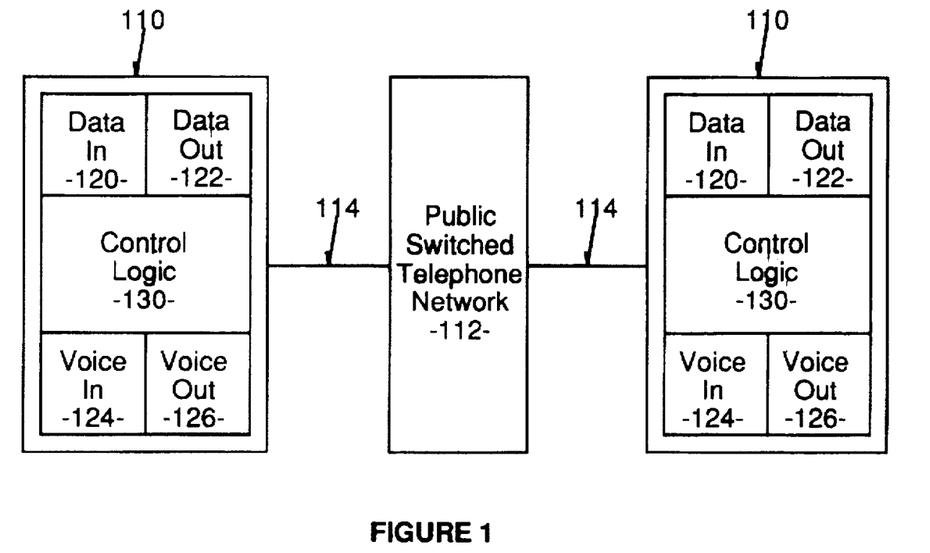
FIG. 1 illustrates the present invention as coupled to a public switched telephone network.

Referring to FIG. 1, the voice and data transceiver 110 of the present invention is illustrated. In a typical system application, transceiver 110 is coupled to a public switched telephone network (PSTN) 112 via telephone line 114. PSTN 112 and lines 114 are standard telephone system components which are well known to those of ordinary skill in the art. In a typical prior art configuration, a standard telephone handset may be coupled to PSTN 112 via line 114. In this configuration, a standard voice conversation may occur between two callers through the PSTN 112. In another typical prior art configuration, a computer with a modem device may be coupled to PSTN 112 via line 114. In this case, a modem can convert digital computer signals to a form that can be transmitted to a receiving computer with a modem device through PSTN 112. In this manner, the PSTN 112 may be used for the independent transfer of voice information or data typically generated by a computer or facsimile machine.

The transceiver 110 of the present invention includes a Voice In interface 124 and a Voice Out interface 126. Voice In interface 124 is a standard connector or interface with a voice receiving device such as a microphone or record/playback device. Voice Out interface 126 is a standard connector or interface with a voice transmitting device such as a speaker or record/playback device. Many methods for receiving and transmitting voice signals will be apparent to those of ordinary skill in the art.

Transceiver 110 includes a Data In interface 120 and a Data Out interface 122. Data In interface 120 is a standard digital computer interface such as a serial or parallel data communications interface. Similarly Data Out interface 122 is a standard data communications interface such as a parallel or serial interface. It will be apparent to those of ordinary skill in the art that many conventional methods exist for transferring digital data to and from transceiver 110 through Data In interface 120 and Data Out interface 122. In a typical implementation, Data In interface 120 and Data Out interface 122 are coupled to a host computer.

Transceiver 110 includes control logic 130. Control logic 130 includes logic for receiving voice information (i.e. voice signals) via Voice In interface 124 and computer or facsimile data (i.e. data signals) via Data In interface 120. Control logic 130 also includes logic for generating control information and for combining the control information with voice signals or data signals for transmission through PSTN 112 using a single telephone line 114. Similarly, control logic 130 includes logic for receiving the control information as combined with voice and data signals via a single telephone line 114. Control logic 130 further includes logic for isolating the voice signals received via line 114 and routing the voice signals through Voice Out interface 126. Similarly, control logic 130 includes logic for isolating data signals received on line 114 and for transferring the data signals to a host computer through Data Out interface 122. In this manner, the present invention provides a means for transmitting and receiving both voice information and computer data via a single standard telephone line. The internal structure and operation of control logic 130 is described in more detail in connection with FIGS. 4 and 5.

Figure 2:
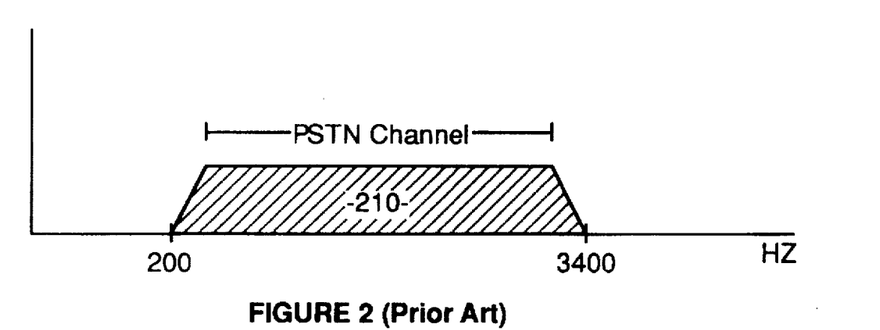
FIG. 2 illustrates the frequency range of a prior art PSTN channel.

Referring now to FIG. 2, a graph illustrates the frequency band or range 210 used for transferring voice information across line 114 and through PSTN 112. As shown, this frequency band of a conventional PSTN channel 210 consumes a frequency range extending from approximately 200 Hz to 3.4 kHz. The amplitude of the PSTN channel 210 is capped at a predefined voltage level. Voice signals or modulated data signals may occupy the entire frequency band within the PSTN channel 210. Signals outside of the PSTN channel 210 may not be transferred via line 114 through PSTN 112. In some cases, signals outside the frequency range of the PSTN channel 210 may be filtered out and thus lost. It is critical therefore that any signals transferred through PSTN 112 must reside within the range of predefined PSTN channel 210 frequencies. The PSTN channel 210 illustrated in FIG. 2 is well known to those of ordinary skill in the art. It will be apparent to those of ordinary skill in the art that the specific frequency values identified in FIG. 2 are not critical to the operation of the present invention. A PSTN channel existing in a different frequency range may also benefit by use of the concepts taught herein.

Figure 3:
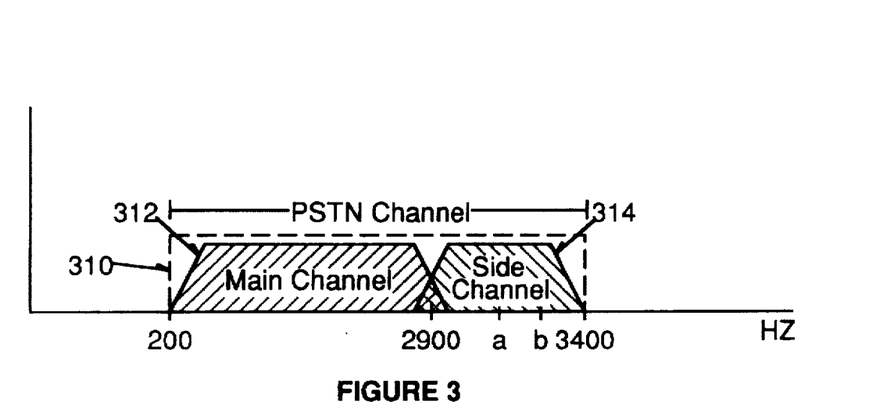
FIG. 3 illustrates the frequency range provided in the present invention for a main channel and a side channel.

Referring now to FIG. 3, the modified PSTN channel 310 of the present invention is illustrated. The present invention modifies the prior art PSTN channel 210 to create a new PSTN channel 310 having two component subchannels, a main channel 312 and a side channel 314. Note that main channel 312 and side channel 314 are configured to fit within the frequency range defined by the prior art PSTN channel 210. By dividing PSTN channel 310 into main channel 312 and side channel 314, the present invention gains the advantage of providing main channel 312 for the transfer of voice signals and data signals at the same time side channel 314 is transferring control information and/or additional data signals. The control information transferred on side channel 314 is used primarily for selecting the transfer of either voice signals or data signals on main channel 312. By providing a separate and independent side channel 314 for controlling main channel 312, the present invention gains the advantage over the prior art of eliminating the inherent delays caused in the prior art design by switching between a voice transfer mode and a data transfer mode using a single channel such as PSTN 210. The present invention also provides the advantage of allowing the transfer of data signals on side channel 314 simultaneous with the transfer of voice signals on main channel 312. In this manner, the transfer of voice signals does not completely suppress the simultaneous transfer of computer information. These advantages are provided by the present invention without redefining the bandwidth of the standard PSTN channel.

Referring again to FIG. 3, main channel 312 occupies a portion of PSTN channel 310. Because main channel 312 shares the PSTN channel bandwidth with side channel 314, main channel 312 is necessarily a smaller bandwidth than PSTN channel 310. The transfer of voice information is therefore constrained to a smaller range of frequencies. This frequency range reduction, however, does not significantly degrade the voice signals transferred through main channel 312. In most cases, the signal degradation of voice signals transferred across a reduced range main channel 312 is almost imperceptible. As will be described below, voice enhancement logic may be used to artificially reconstruct voice signals degraded by transfer across main channel 312. As an additional option to reduce signal degradation, main channel 312 may be located at any frequency within PSTN channel 310. For the example illustrated in FIG. 3, main channel 312 is located at the lower end of the PSTN channel 310 frequency spectrum and side channel 314 is located at the upper end of the spectrum. Alternatively, side channel 314 may be located at the lower end of the PSTN channel 310 frequency spectrum and main channel 312 may be located at the upper end of the frequency spectrum. As another alternative, side channel 314 may be positioned in the middle of main channel 312 thereby splitting main channel 312 into a lower half and an upper half. In the preferred embodiment, however, side channel 314 must occupy a contiguous range of frequencies. By arranging side channel 314 above, below, or in the middle of main channel 312, the signal degradation for the transfer of signals through main channel 312 may be minimized.

Having defined a frequency range for main channel 312 and side channel 314, the control logic 130 of the present invention provides a means for controlling the transfer of voice and data signals across main channel 312 and the transfer of control and data signals across side channel 314. In the preferred embodiment, data is transferred across main channel 312 using a high speed modem technology such as a quadrature amplitude modulation (QAM) technology. Control information and data is transferred across side channel 314 using a lower capacity transmission technology such as a frequency shift keying (FSK) technology. Using FSK, a binary "1" value may be represented as a particular frequency such as frequency "a" illustrated in FIG. 3. Similarly, a binary "0" value may be represented as a different frequency value such as frequency "b" illustrated in FIG. 3. The use of QAM and FSK modem technology is well known to those of ordinary skill in the art. Thus, control and data may be transmitted through side channel 314 without affecting the simultaneous transmission of voice and data in main channel 312.

The ability to switch the main channel 312 to/from a voice transfer mode from/to a data transfer mode is much more efficient using the side channel 314 or other independent control mechanism. Normally, to start a QAM modem data signal sequence, the receiver must first perform timing recovery. Next, the transmitter and receiver must execute a training sequence. This process can take up to a half second in a conventional system. Because of this delay in effecting a switch between a voice transfer mode and a data transfer mode, less data is transmitted during a voice gap. The side channel (as part of its control function) will maintain the receiver clocks thereby allowing a fast timing recovery and a very fast training sequence.

Figure 4:
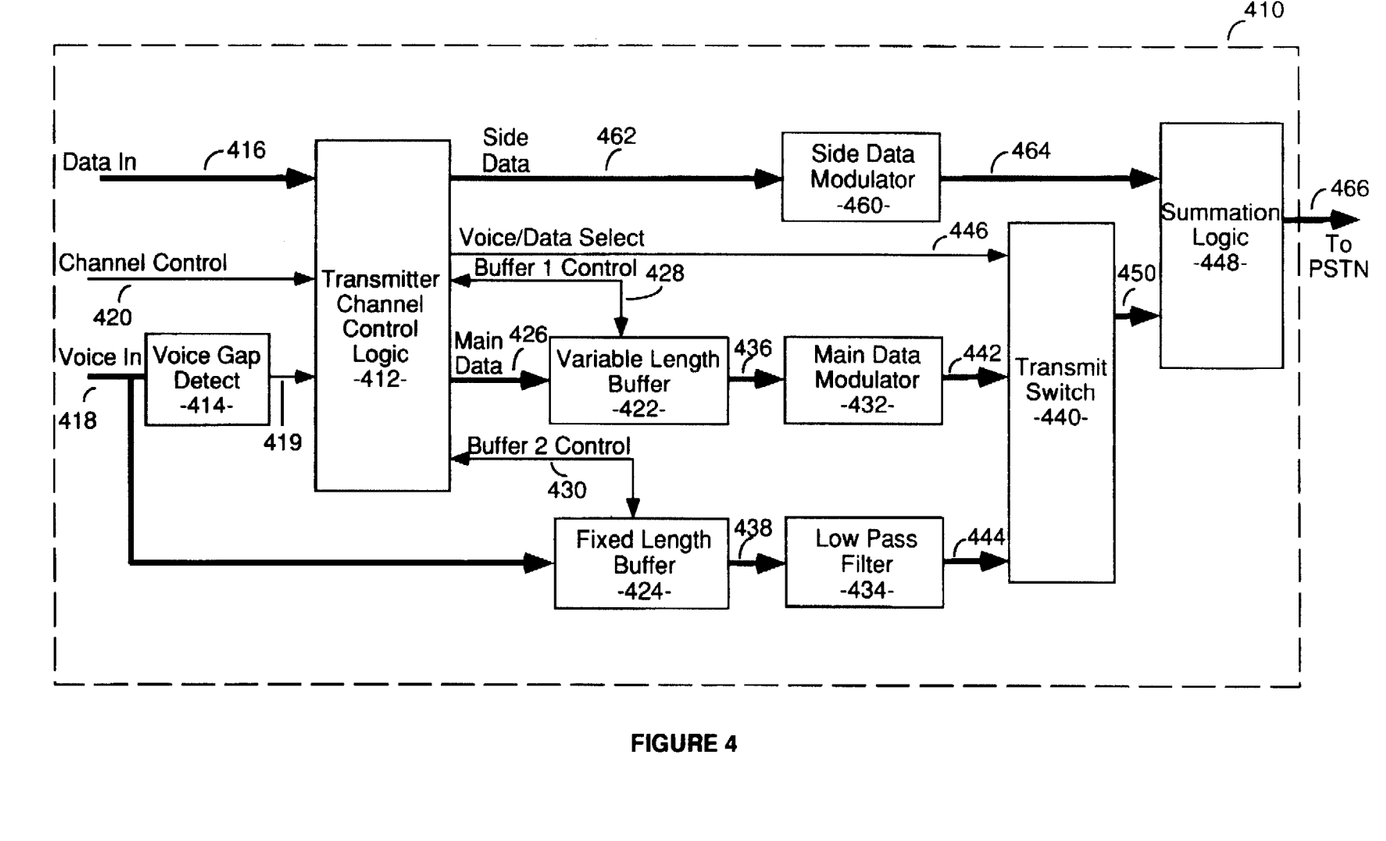
FIG. 4 illustrates the structure of the transmitter of the present invention.
Figure 5:
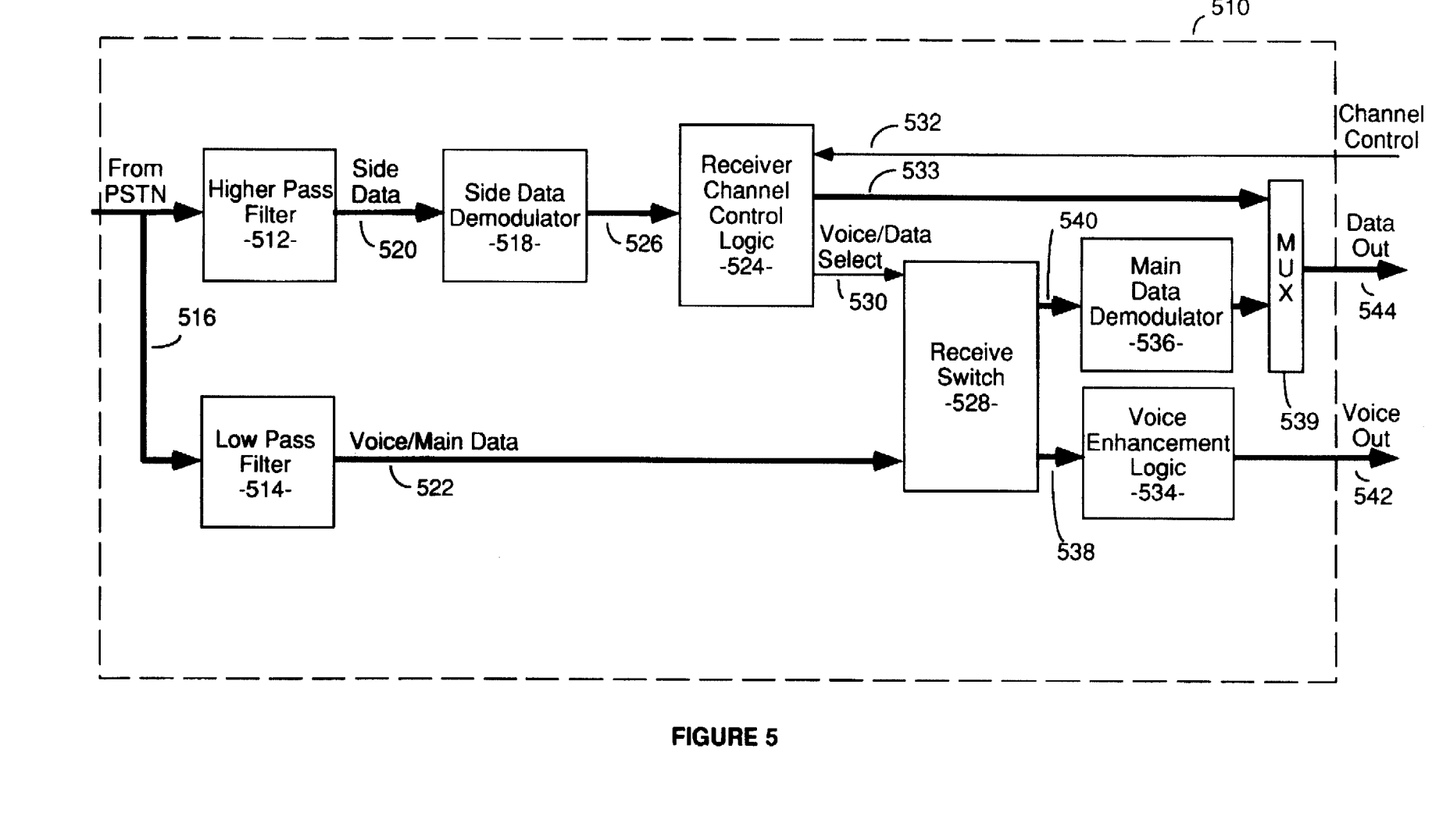
FIG. 5 illustrates the structure of the receiver of the present invention.

The components of the present invention are roughly divided into transmitter logic and receiver logic. The transmitter logic is used for transmitting voice signals and data signals across a single telephone line 114 through PSTN 112 to a receiver. The receiver logic is used for receiving voice and data signals sent through PSTN 112. The transmitter logic of the present invention is illustrated in FIG. 4 and described below. The receiver logic is illustrated in FIG. 5 and described below.

Referring now to FIG. 4, the transmitter 410 of the present invention is illustrated. The transmitter 410 includes transmitter channel control logic 412. Control logic 412 receives Data In signals on line 416. The Data In signals 416 are received from Data In interface 120. Data and control information may be supplied to control logic 412 from a host computer on Data In lines 416. In general, the data provided to control logic 412 on Data In lines 416 is routed for transfer to PSTN 112 via main channel 312. Data is so routed to main channel 312 by being output on the main data lines 426 by control logic 412. As will be described below, the main data output on main data lines 426 is held in variable length buffer 422 for subsequent output on main channel 312.

A portion of the data provided on Data In lines 416 may be routed for transfer to PSTN 112 via side channel 314. Data is routed to side channel 314 by being output on side data lines 462 by control logic 412. Control logic 412 routes incoming data on either main data lines 426 or side data lines 462 as determined explicitly by command codes provided in the data received on Data In lines 416 or implicitly as determined by the availability of main channel 312. In some cases, main channel 312 will be unavailable for the transfer of data signals while voice signals are being transferred. In these cases, main data (i.e. data waiting to be sent on the main channel) is held in variable length buffer 422 until main channel 312 again becomes available for transfer of data. On the other hand, side channel 314 will always be available for the transfer of control information or data. However, the side channel 314 typically operates at a slower data transfer rate. If data received by control logic 412 via Data In lines 416 indicates a side data transfer request as indicated by a predetermined command code or if main channel 312 is blocked by the transfer of voice information on main channel 312, control logic 412 routes incoming data out on side data lines 462. In other cases, data received on Data In lines 416 is routed to main channel 312 via main data line 426.

Control logic 412 also receives two control lines in the preferred embodiment. First, a channel control line 420 is received. Channel control line 420 is used to instruct control logic 412 to explicitly switch between the transfer of voice signals or data signals on main channel 312. Channel control line 420 allows a host computer to override the automatic switching between a data transfer mode and a voice transfer mode on main channel 312. A signal on channel control line 420 indicates either a voice transfer mode or a data transfer mode on main channel 312. This signal is used by control logic 412 to generate a signal on voice/data select line 446. Voice/data select line 446 is used to control transmit switch 440 to output either data signals or voice signals on output lines 450.

A second control line received by transmitter channel control logic 412 is provided by voice gap detect circuit 414.

Voice gap detect circuit 414 receives Voice In signals on Voice In line 418. Voice In signals are provided by Voice In interface 124. The Voice In signals comprise voice information as may be spoken by a caller on a telephone line. Voice gap detect circuit 414 is a conventional and well known circuit for detecting gaps or silence in a telephone conversation. Because a substantial portion of a typical telephone call is silent (i.e., absent voice signals), the voice gaps may be used for the transfer of computer data on main channel 312. When voice tones are again detected on Voice In lines 418, the transfer of data on main channel 312 is suspended and the transfer of the voice signals from Voice In lines 418 to main channel 312 is enabled. Thus, voice gap detect circuit 414 provides a signal on line 419 to control logic 412 that indicates when a voice gap is present in the voice signals on Voice In lines 418. Voice gap detect circuit 414 also provides an indication to control logic 412 that indicates when a voice gap is absent in the signals on Voice In lines 418. The control signals received on line 419 by control logic 412 are used to determine the condition of the signal output by control logic 412 on voice/data select line 446. If the signal received on channel control line 420 indicates a voice select request or if the control signal received on line 419 indicates the absence of a voice gap (i.e., active voice tones are present on Voice In lines 418), control logic 412 generates a voice select signal on voice/data select line 446. Similarly, if the signal received on channel control line 420 indicates a data select request or if the control signal received on line 419 indicates the presence of a voice gap (i.e., active voice tones are not present on Voice In lines 418), control logic 412 generates a data select signal on voice/data select line 446. In this manner, transmit switch 440 is controlled by voice/data select line 446 to output on lines 450 voice signals during active voice activity or data signals during gaps in the voice signals. A voice gap detect circuit such as circuit 414 is well known to those of ordinary skill in the art.

In addition, control logic 412 generates control information for transmission on the side channel 314. This control information corresponds to the select signal information generated on the voice/data select line 446. If the signal received on channel control line 420 indicates a voice select request or if the control signal received on line 419 indicates the absence of a voice gap (i.e., active voice tones are present on Voice In lines 418), control logic 412 generates a voice select signal for transmission on side data line 462. Similarly, if the signal received on channel control line 420 indicates a data select request or if the control signal received on line 419 indicates the presence of a voice gap (i.e., active voice tones are not present on Voice In lines 418), control logic 412 generates a data select signal for transmission on side data line 462. In this manner, receive switch 528 (illustrated in FIG. 5) is controlled by voice/data select information transmitted on side channel 314.

Transmitter logic 410 provides a buffer for both data signals transferred on main channel 312 and a buffer for voice signals transferred on main channel 312. In the preferred embodiment of the present invention, a variable length buffer 422 is provided for data transferred on main channel 312 (main data). Variable length buffer 422 is implemented in the preferred embodiment as a first-in-first-out (FIFO) buffer or random access memory of a size sufficient to retain data while main channel 312 is busy transferring voice information. A buffer 1 control line 428 is connected between control logic 412 and variable length buffer 422 to allow control logic 412 to enable or disable the output of main data by variable length buffer 422 on lines 436. In addition, buffer 1 control line 428 provides a means by which variable length buffer 422 may indicate to control logic 412 that the buffer is full or nearly full. During normal operation, control logic 412 fills buffer 422 with main data received on Data In lines 416 and output on main data lines 426. When a voice gap occurs as indicated by control line 419, buffer 422 is enabled via buffer 1 control line 428 to output main data on lines 436. When main data transfer on main channel 312 is stalled by a voice transfer, control logic 412 disables buffer 422 from outputting main data on lines 436. As buffer 422 fills or nearly fills, an indication on line 428 provided by buffer 422 signals control logic 412 to suspend the transfer of main data on main data lines 426. The implementation of a FIFO buffer such as buffer 422 is well known to those of ordinary skill in the art.

A fixed length buffer 424 is provided for the temporary storage of voice information received on Voice In lines 418. Fixed length buffer 424 is provided to prevent any loss of voice signals received on lines 418. Digitized voice signals may be stored in a first-in-first-out FIFO or random access memory device. A buffer 2 control line 430 is connected between control logic 412 and fixed length buffer 424 to enable or disable the output of voice signals on output lines 438. In addition, buffer 2 control line 430 is used to indicate when fixed length buffer 424 is full or nearly full. When active voice tones are present on Voice In lines 418, control logic 412 signals fixed length buffer 424 to output the voice information on output lines 438.

Buffer 424 also provides a "voice gap look ahead" or voice gap anticipation mechanism for anticipating voice gaps in the voice signals received on lines 418. This anticipation mechanism significantly enhances voice/data switching efficiency and speed. A fixed length delay of ⅛ to ¼ of a second, in the preferred embodiment, is provided in buffer 424 between the voice input 418 and the output 438 of buffer 424. Voice gap detect logic 414 therefore receives a voice gap prior to the gap being presented to transmit switch 440. This delay allows for characterization of voice gaps before the gaps are presented on input lines 444 of transmit switch 440. This characterization defines the size and nature of the voice gap before the gap is actually presented to switch 440. Transmitter channel control logic 412 receives anticipated voice gap information from voice gap detect logic 414 and uses the voice gap information to optimize the switching of main channel 312 from a voice transmission mode to a data transmission mode. By anticipating the voice gap, control logic 412 has time to transmit appropriate control signals to the receiver 510 on side channel 314 for the purpose of setting receiver 510 to a data receive mode. In this manner, the transmitter 410 and the receiver 510 are primed and ready to transfer data as soon as the delayed voice gap is presented to transmit switch 440 on lines 444.

A main data modulator 432 receives computer data from lines 436 from variable length buffer 422. Main data modulator 432 modulates the computer data into a frequency range corresponding to main channel 312. In the preferred embodiment, main data modulator 432 is a quadature amplitude modulation (QAM) circuit for high speed data transmission. QAM modulation is a technique well known to those of ordinary skill in the art. The modulated computer data is output by main data modulator 432 on lines 442.

The output of fixed length buffer 424 is input by low pass filter 434 from lines 438. Low pass filter 434 is provided to constrain the voice signals to a frequency region corresponding to main channel 312. In an alternative embodiment of the present invention where side channel 314 is positioned at a lower frequency range than main channel 312, low pass filter 434 may be replaced by a high pass filter to again constrain the voice signals to the frequency range corresponding to main channel 312. It will be apparent to those of ordinary skill in the art that a filter may be provided to constrain the voice signals to main channel 312 wherever main channel 312 is located within the frequency range of PSTN channel 310. The filtered voice signals are output by filter 434 on lines 444.

Transmit switch 440 receives modulated data on lines 442 and filtered voice signals on lines 444. Transmit switch 440 also receives a voice/data select control signal on line 446. If voice/data select signal on line 446 indicates a voice transmission, transmit switch 440 routes voice signals from lines 444 to output lines 450. If, however, the control signal on voice/data select line 446 indicates a data transmission, transmit switch 440 routes computer data received on lines 442 to output lines 450. In this manner, voice/data select line 446 is used to switch between data signals on line 442 or voice signals on lines 444. Thus, either data or voice signals are output on line 450.

Computer data or control signals output by control logic 412 for transmission on side channel 314 are output on side data lines 462 and received by side data modulator 460. Side data modulator 460 is a standard circuit for modulating digital information into a frequency corresponding to side channel 314. In the preferred embodiment, side data modulator 460 is a frequency shift keyed (FSK) modulation circuit which provides a moderate speed data transmission capability. FSK modems are well known to those of ordinary skill in the art. The modulated side data is output by side data modulator 460 on lines 464.

Summation logic 448 receives voice signals or main data signals on lines 450 and side data on lines 464. These signals are added together to produce a single combined output on lines 466. This combined signal is transmitted to PSTN 112 via telephone line 114. Circuits for summing two input signal sources are well known to those of ordinary skill in the art.

The transmitter channel control logic 412 can be implemented as an application specific integrated circuit (ASIC), a gate array, discrete logic, or a software control program. Using the teachings of the present invention as specified herein, it will be apparent to one of ordinary skill in the art that the control logic 412 of the present invention may be implemented in any of these ways.

Referring now to FIG. 5, the receiver 510 of the present invention is illustrated. Receiver 510 receives voice and data signals on lines 516 from PSTN 112. Signals received on lines 516 comprise side channel data and main channel data as generated by the transmitter 410 described above. The side channel data comprises control and computer data transmitted in the side channel 314 frequency range. Main channel information includes either voice signals or data signals as transmitted in the main channel 312 frequency range. Lines 516 are coupled to high pass filter 512 and low pass filter 514. High pass filter 512 is used to isolate signals in the side channel 314 frequency range. Low pass filter 514 is used to isolate main channel signals in the main channel 312 frequency range. It will be apparent to those of ordinary skill in the art that conventional filters may be used to isolate side channel data and main channel information where ever these channels may be defined within the PSTN channel 310 frequency range. For example, side channel 314 may be positioned in a lower frequency range than main channel 312. In this case, high pass filter 512 may be replaced with a low pas filter and low pass filter 514 may be replaced with a high pass filter. Similarly, conventional filters may be used to isolate side channel data if side channel 314 is positioned in the midst of the main channel 312 frequency range. High pass filter 512 thereby produces side data which is received on side channel 314. Similarly, low pass filter 514 outputs either voice signals or main data received on main channel 312.

Side data is output to side data demodulator 518 on lines 520. Demodulator 518 is a standard FSK demodulator as well known to those of ordinary skill in the art. Side data demodulator 518 produces demodulated side data on lines 526. This demodulated side data is output to receiver channel control logic 524. Control logic 524 decodes control information received on side channel 314 via lines 526. Side channel control information is used by control logic 524 to select a mode by which information is received on main channel 312. Predetermined codes within this side data are used to define either a main channel voice receive mode or a main channel data receive mode. This mode is selected by control logic 524 with an output on voice/data select line 530. If side data indicates a voice receive mode, control logic 524 outputs a voice select signal on line 530. If, however, side data indicates a data receive mode, control logic 524 outputs a data select signal on line 530. The side channel 314 may also be used to transfer data. Control logic 524 routes side channel data to multiplexer 539 on data lines 533. The side data is output to the Data Out interface 122 on lines 544 while voice signals are being output on lines 542.

Receive switch 528 receives a signal on voice/data select line 530. Receive switch 528 receives main channel information on lines 522 and routes this information out on lines 538 to voice enhancement logic 534 or out on lines 540 to main data demodulator 536. Receive switch 528 routes input information from line 522 out on lines 538 if a voice receive mode is selected on control line 530. Receive switch 528 routes incoming information on line 522 out on line 540 if a data receive mode is selected on control line 530. In this manner, side data is used to command the reception of information on main channel 312. Voice information received on main channel 312 is routed on lines 538 to voice enhancement logic 534. Because a small level of voice degradation may occur in transmitting the voice signals in a reduced frequency range of main channel 312, some implementations of the present invention may require voice enhancement logic 534. Logic 534, however, is not necessary in all cases. Conventional methods exist for enhancing voice signals where some level of information loss has encountered. For example, a simple linear interpolation of points in a particular voice signal may be used to fill in missing information of a voice signal. The enhanced or non-enhanced voice signals are output to a Voice Out interface 126 on lines 542.

Computer data received on lines 540 is output to a main data demodulator 536. In the preferred embodiment, main data demodulator 536 is a QAM demodulator, which is a demodulation technique well known to those of ordinary skill in the art. The demodulated main channel data is output through multiplexer 539 to a Data Out interface 122 on lines 544. Multiplexer 539 is provided so side channel 314 may be used to transmit data at the same time voice is being transmitted on main channel 312. Multiplexer 539 allows either side data or main data to be output to the Data Out interface 122 on lines 544.

A channel control line 532 is coupled to receiver channel control logic 524. A signal on channel control line 532 is used to explicitly select a receive mode for main channel 312. This channel control signal may specify that control logic 524 should produce either a voice select signal or a computer data select signal on voice/data select line 530. A command signal on channel control line 532 overrides control data received on side channel 314. Using channel line 532, a host computer may explicitly define a mode of reception. Thus, the receiver 510 of the present invention produces voice signals and data signals as received and independently controlled by a single public switched telephone line. Receiver channel control logic 524 may be implemented as an application specific integrated circuit (ASIC), a gate array, discrete logic, or a software control program. Using the teachings of the present invention as specified herein, it will be apparent to one of ordinary skill in the art that the control logic 524 of the present invention may be implemented in any of these ways. Similarly, receive switch 528 may be implemented using of a number of commonly available multiplexers or other conventional switching devices.

Thus, a transceiver providing simultaneous transfer of control information with voice and data over a public switched telephone network line is disclosed. Although the present invention is described herein with reference to a specific embodiment, many modifications and variations therein will readily occur to those skilled in the art. Accordingly, all such variations and modifications are included within the intended scope of the present invention as defined by the following claims.

What is claimed is:

1. A transceiver providing simultaneous transfer of control information with voice and data over a single telephone line, said transceiver comprising:

a voice interface for sending and receiving voice signals;

a data interface for sending and receiving data signals;

a telephone line interface for sending and receiving voice and data signals over said single telephone line;

a transmitter coupled to said voice interface, said data interface, and said telephone line interface, said transmitter for sending either voice signals or data signals in a first channel represented as a first frequency band within a frequency range pre-defined for said single telephone line, said transmitter for sending either control information or data signals in a second channel represented as a second frequency band within said frequency range pre-defined for said single telephone line, said first channel having a different frequency band from said second channel, said voice or said data signals being sent on said first channel simultaneously with said control information sent on said second channel, said control information specifying whether voice signals or data signals are being sent on said first channel by said transmitter, a portion of said data signals also being sent on said second channel when said voice signals are being sent on said first channel; and a receiver coupled to said voice interface, said data interface, and said telephone line interface, said receiver for receiving either voice signals or data signals on said first channel, said receiver also for receiving control information on said second channel simultaneously with receipt of voice signals or data signals on said first channel, said second channel receiving said portion of said data signals on said second channel when said voice signals are being received on said first channel, said receiver further including a receive switch coupled to said voice interface and said data interface for switching between output of voice signals or data signals, said receive switch being responsive to control information received on said second channel.

2. The transceiver as claimed in claim 1 wherein said transmitter includes a voice gap detector coupled to said voice interface, said voice gap detector for detecting the presence or absence of gaps in said voice signals, said transmitter further including a transmit switch coupled to said voice interface and said data interface for sending said voice signals on said first channel if said voice gap detector detects the absence of a gap in said voice signals, said transmitter for sending said data signals on said first channel if said voice gap detector detects the presence of a gap in said voice signals.

3. The transceiver as claimed in claim 2 wherein said control information includes an indication that voice signals are being sent on said first channel by said transmitter if said voice gap detector detects the absence of a gap in said voice signals, said control information includes an indication that data signals are being sent on said first channel by said transmitter if said voice gap detector detects the presence of a gap in said voice signals.

4. The transceiver as claimed in claim 1 further including a control interface coupled to said transmitter, said transmitter for receiving override control information via said control interface, said override control information for instructing said transmitter to send either said voice signals or said data signals on said first channel.

5. The transceiver as claimed in claim 1 wherein said transmitter further includes a first buffer for storing said data signals prior to transmission on said first channel while said first channel is transferring voice signals and is unavailable for transfer of said data signals and said second channel is also unavailable for transfer of said portion of said data signals.

6. The transceiver as claimed in claim 5 wherein said transmitter further includes a second buffer for storing said voice signals to prevent loss of said voice signals prior to transmission on said first channel.

7. The transceiver as claimed in claim 1 wherein said transmitter further includes a side data modulator for modulating control information prior to transmission on said second channel, said transmitter further includes a main data modulator for modulating said data signals prior to transmission on said first channel.

8. The transceiver as claimed in claim 1 wherein said receiver further includes a side data demodulator for demodulating control information after receipt on said second channel, said receiver further includes a main data demodulator for demodulating said data signals after receipt on said first channel.

9. The transceiver as claimed in claim 1 wherein said receiver further includes a first filter for extracting information received on said first channel, and a second filter for extracting information received on said second channel.

10. The transceiver as claimed in claim 1 wherein said receiver further includes a high pass filter for extracting information received on said first channel, said receiver further includes a low pass filter for extracting information received on said second channel.

11. The transceiver as claimed in claim 5 wherein said transmitter further includes a second buffer having delay means for delaying said voice signals to create a voice gap prior to transmission on said first channel, said transmitter including control logic for anticipating said voice gap in said voice signals, said control logic using said voice gap to generate control signals on said second channel to switch said receiver to a data receive mode prior to staging said voice gap for output on said first channel.

12. A transmitter providing simultaneous transmission of control information with voice and data over a single telephone line, said transmitter comprising:
- a first circuit for sending either voice signals or data signals in a first channel represented as a first frequency band within a frequency range pre-defined for said single telephone line; and
- a second circuit for sending control information on in a second channel represented as a second frequency band within said frequency range pre-defined for said single telephone line, said control information specifying whether voice signals or data signals are being sent on said first channel, said first channel having a different frequency band from said second channel, said first circuit sending said voice or said data signals on said first channel simultaneously with said control information sent on said second channel by said second circuit, said second circuit also sending a portion of said data signals on said second channel when said voice signals are being sent on said first channel and said first channel is unavailable for sending said data signals.

13. A receiver providing simultaneous reception of control information with voice and data over a single telephone line, said receiver comprising:
- a first circuit for receiving either voice signals or data signals in a first channel represented as a first frequency band within a frequency range pre-defined for said single telephone line; and
- a second circuit for receiving control information in a second channel represented as a second frequency band within said frequency range pre-defined for said single telephone line, said control information specifying whether voice signals or data signals are being received on said first channel, said first channel having a different frequency band from said second channel, said first circuit receiving said voice or said data signals on said first channel simultaneously with said control information received on said second channel by said second circuit, said second circuit also receiving a portion of said data signals on said second channel when said voice signals are being sent on said first channel and said first channel is unavailable for sending said data signals.

14. A method for simultaneously transmitting control information with voice and data over a single telephone line, said method comprising the steps of:
- sending either voice signals or data signals in a first channel represented as a first frequency band within a frequency range pre-defined for said single telephone line; and
- sending control information in a second channel represented as a second frequency band within said frequency range pre-defined for said single telephone line, said control information specifying whether voice signals or data signals are being sent on said first channel, said first channel having a different frequency band from said second channel, said voice or said data signals being sent on said first channel simultaneously with said control information sent on said second channel, said second channel sending a portion of said data signals when said voice signals are being sent on said first channel and said first channel is unavailable for sending said data signals.

15. A method for simultaneously receiving control information with voice and data over a single telephone line, said method comprising the steps of:
- receiving either voice signals or data signals in a first channel represented as a first frequency band within a frequency range pre-defined for said single telephone line; and
- receiving control information in a second channel represented as a second frequency band within said frequency range pre-defined for said single telephone line, said control information specifying whether voice signals or data signals are being received on said first channel, said first channel having a different frequency band from said second channel, said voice or said data signals being received on said first channel simultaneously with said control information received on said second channel, said second channel also receiving a portion of said data signals when said voice signals are being sent on said first channel and said first channel is unavailable for sending said data signals.

* * * * *